United States Patent [19]
Armstrong et al.

[11] 4,155,110
[45] May 15, 1979

[54] REFLECTOR-LAMP MODULE FOR PHOTOFLASH ARRAY

[75] Inventors: Donald E. Armstrong, Williamsport; Emergy G. Audesse, Beverly; John W. Shaffer; Donald W. Hartman, both of Williamsport, all of Pa.

[73] Assignee: GTE Sylvania, Incorporated, Stamford, Conn.

[21] Appl. No.: 829,794

[22] Filed: Sep. 1, 1977

[51] Int. Cl.² ............................................. G03B 15/02
[52] U.S. Cl. ........................................ 362/16; 362/11; 362/13; 362/235; 362/247; 362/310; 362/347
[58] Field of Search .................... 362/11–15, 362/16, 235, 247, 310, 347

[56] References Cited

U.S. PATENT DOCUMENTS 3,980,875  9/1976  Coté ........................................ 362/15
3,991,308  11/1976  Lauter ...................................... 362/14

Primary Examiner—Stephen J. Lechert, Jr.
Attorney, Agent, or Firm—Edward J. Coleman

[57] ABSTRACT

A photoflash lamp-reflector module for use in a photoflash unit having a plurality of such lamp-reflector modules arranged in a compact array. Each reflector has a substantially parabolic surface with a centrally disposed elongated cylindrical recess having a longitudinally extending central slot. The associated tubular lamp is nested within the recessed portion of the reflector, whereby an oversized lamp is accommodated by the reflector with little or no loss of light output.

13 Claims, 6 Drawing Figures

REFLECTOR-LAMP MODULE FOR PHOTOFLASH ARRAY

BACKGROUND OF THE INVENTION

The present invention relates to photoflash lamp-reflector modules and, more particularly, to multiple photoflash lamp arrays using such modules.

Numerous multilamp photoflash arrangements with various types of sequencing circuits have been described in the prior art; particularly, in the past few years. A currently marketed photoflash unit (described in U.S. Pat. Nos. 3,894,226; 3,912,442; 3,935,442; 3,937,946; 3,941,992; 3,952,320 and 4,017,728 and refered to as a flip flash) employs high-vlotage type lamps adapted to be ignited sequentially by successively applied high-voltage firing pulses from a source such as camera-shutter-actuated piezoelectric element. The flip flash unit comprises a planar array of eight high-voltage type flashlamps mounted on a printed circuit board with an array of respectively associated reflectors disposed therebetween. The lamps are arranged in two groups of four disposed on the upper and lower halves respectively of the rectangular-shaped circuit board. A set of terminal contacts at the lower end of the unit is provided for activation of the upper group of lamps, while a set of terminal contacts at the top of the unit is operatively associated with the lower group of four lamps. The application of successive high-voltage pulses (e.g., 500 to 4,000 volts from, say, a piezoelectric source controlled by the shutter of a camera in which the array is inserted) to the terminal contacts at the lower end of the unit causes the four lamps at the upper half of the array to be sequentially ignited. The array may then be turned end for end and again inserted into the camera in order to flash the remaining four lamps.

The flip flash circuit board comprises an insulating sheet of plastic having a pattern of conductive circuit traces, including the terminal contacts, on one side. The flashlamp leads are electrically connected to these circuit traces by means of eyelets secured to the circuit board and crimped to the lead wires. The circuitry on the board includes six printed, normally open, connect switches that chemically change from a high to low resistance, so as to become electrically conducting after exposure to the radiant heat energy from an ignited flashlamp operatively associated therewith. The purpose of these switches is to provide lamp sequencing and one-at-a-time flashing. The four lamps of each group are arranged in parallel with three of the four lamps being connected in series with their respective thermal connect switches. Initially, only the first of the group of four lamps is connected directly to the voltage pulse souce. When this first group flashes, it causes its associated thermal connect switch (which is series connected with the next or second lamp) to become permanently conductive. Because of this action, the second lamp of the group of four is connected to the pulse source. This sequence of events is repeated until all four lamps have been flashed.

The overall construction of the flip flash unit comprises front and back plastic housing members with interlocking means for providing a unitary structure. The front housing member is a rectangular concavity and the back housing is substantially flat. Sandwiched between the front and back housing members, in the order named, are the flashlamps, a unitary reflector member, preferably of aluminum-coated plastic, shaped to provide the individual reflectors of the array, an insulating sheet, the printed circuit board, and an indicia sheet, which is provided with information, trademarks, and flash indicators located behind the respective lamps and which change color due to heat and or light radiation from a flashing lamp, thus indicating at a glance which of the lamps have been flashed and not flashed.

The production of compact photoflash arrays, such as the flip flash described above, has forced lamp manufacturers to use stronger glass vessels, such as those of borosilicate glass (e.g., see U.S. Pat. No. 3,506,385), to contain the higher internal loadings of oxygen and filamentary combustible material which are needed to provide a required light output in a specific reflector embodiment, along with product safety. For example, in a present flip flash type unit containing lamps manufactured from borosilicate glass, the finished lacquer-coated lamp has a diameter of about 0.285 inch, a length of about 1 1/32 inches, and an internal volume of about 0.35 cc. Each lamp contains an oxygen fill pressure of 950 cm. Hg (12.5 atmospheres) and a sufficient quantity of shredded zirconium, as the combustible metal fill, to obtain a specified light output when used in a prior art reflector which is most efficient for this lamp size. This prior art lamp and reflector combination is of the type shown in U.S. Pat. No. 3,609,332 of Schindler with respect to different type arrays. In Schindler, each reflector has a parabolic-type surface for essentially its entire effective reflecting area with the lamp nested adjacent the innermost part of the parabolic curvature.

Another prior art lamp-reflector arrangement is described in U.S. Pat. No. 4,032,769 of Hartman et al with respect to a linear flash array unit referred to as a flash bar. In the Hartman et al patent, the lamp-reflector units are arranged in two linear rows facing in opposite directions and compactly nested back-to-back. Each reflector has a parabolic surface with an elongated cylindrical recess behind its associated tubular lamp, the recess providing an air space between the reflector and lamp which functions as a thermal insulator for minimizing heat distortion of adjacent reflectors upon flashing of the lamp. This elongated cylindrical recess is permitted by the back-to-back nesting configuration of the flash bar but would not appear suitable for the compact sandwich construction of the flip flash planar array. On the other hand, the unidirectional planar array does not have the heat distortion problem of the bidirectional flash bar array.

In any event, although the light output performance of flash array systems such as flip flash has been good, a problem arises in that the manufacturing costs to produce such systems is substantially higher than prior product types, and costs continue to increase as the systems become more complex.

SUMMARY OF THE INVENTION

In view of the foregoing, it is an object of the present invention to provide improved reflector-lamp modules for photoflash lamp devices, such as multilamp photoflash arrays, which permit the arrays to be more economically produced while maintaining the specified light output and product safety.

This and other objects, advantages and features are attained, in accordance with the invention, by providing a photoflash device comprising the combination of a reflector and tubular photoflash lamp wherein the reflector has a substantially parabolic surface with a centrally disposed elongated cylindrical recess having a longitudinally extending slot centrally located therein. The lamp is nested within the recessed portion of the reflector. In a preferred embodiment the thicknesses of the recessed portion of the reflector is tapered to be substantially thinner about at least portions of the periphery of the slot. More specifically, the reflector is of a molded material, and the convex cylindrical shape of the back side of the recessed portion of the reflector is flattened along at least portions thereof adjacent the periphery of the slot, the flattened portions thereby providing the taper.

A feature of the lamp-reflector configuration according to the invention is that it permits the use of a larger lamp in the confines of a prior art array package. In essence, the configuration accommodates a lamp that would be oversize for the prior art array reflector, such as a flip flash reflector generally conforming to the teachings of the Schindler patent. The use of a large lamp volume enables the oxygen fill pressure of the lamp to be reduced, which in turn permits the use of a soft glass envelope. The use of soft glass, of course, provides a very substantial reduction in the cost of making the lamp.

The use of recesses or slots in reflectors would ordinarily be expected to significantly reduce the efficiency of light output. Quite surprisingly, however, the reflector configuration according to the invention has been found to significantly reduce the inefficiencies. With respect to the lamp, the increased volume increases the efficiency of light output over the previously used smaller lamp. As a result, the combination of the oversized lamp with the reflector according to the invention provides a reflector-lamp module with little or no loss of light output as compared to the considerably more expensive prior art module having a parabolic-type reflector with the smaller hard glass lamp. When used in a multilamp array such as a flip flash unit, the present soft glass lamp and reflector combination provides a significant cost reduction, while maintaining compactness, light output, and safety.

BRIEF DESCRIPTION OF THE DRAWINGS

This invention will be more fully described hereinafter in conjunction with the accompanying drawings, in which.

DESCRIPTION OF PREFERRED EMBODIMENT

Figure 1:
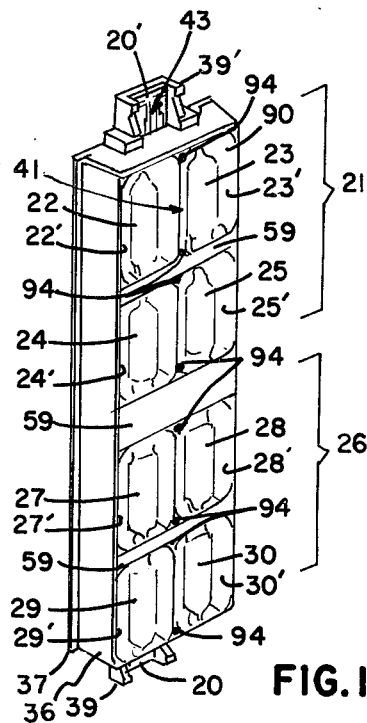
FIG. 1 is a perspective view of a multilamp photoflash unit according to the invention.

The concepts of the present invention are particularly useful as embodied in a multilamp photoflash array similar to the type described in U.S. Pat. No. 3,894,226 or 4,017,728 etc., and referred to as a flip flash. As illustrated in FIG. 1, this multilamp unit is of the planar array type which contains a plurality of electrically fired flashlamps and is provided with a plug-in connector tab 20 at the lower side or end thereof adapted to fit into a socket of a camera or flash adaptor. The array is provided with a second plug-in connector tab 20' at the top side or end thereof, whereby the array unit is adapted to be attached to the camera socket in either of two orientations, i.e., with either the tab 20 or tab 20' plugged into the socket. The array is provided with an upper group 21 of flashlamps 22, 23, 24 and 25, and a lower group 26 of flashlamps 27, 28, 29 and 30, the lamps being arranged in a planar configuration. Reflectors 22', etc., are disposed behind their respective flashlamps so that as each lamp is flashed, its light is projected forwardly of the array. The lamps are arranged and connected so that when the array is connected to a camera by the connector 20, only the upper group 21 of lamps will be flashed, and when the array is turned end for end and connected to the camera by the other connector 20', only the then upper group 26 of the lamps will be flashed. By this arrangement, only lamps relatively far from the camera lens axis are flashable, thus reducing the undesirable red-eye effect.

The construction of the array comprises front and back housing members 36 and 37 which preferably are made of plastic and are provided with interlocking members (not shown) which can be molded integrally with the housing members and which lock the housing members together in final assembly to form a unitary flash array structure. In the preferred embodiment shown, the front housing member 36 is a rectangular concavity and the back housing member 37 is substantially flat and includes integral extensions 39 and 39' at the ends thereof which partly surround and protect the connector tabs 20 and 20' and also function to facilitate mechanical attachment to the camera socket. Sandwiched between the front and back housing members 36 and 37, in the order named, are the flashlamps 22, etc., an electrically conductive unitary reflector member 41 (preferably of aluminum coated plastic) shaped to provide the individual reflectors 22', etc., an electrically insulating sheet (not shown), a printed circuit board 43 provided with integral connector tabs 20 and 20', and an indicia sheet (not shown) which may be provided with information and trademarks, and other indicia such as flash indicators located behind the respective lamps and which change color due to heat and/or light radiation from a flashing lamp, thus indicating at a glance which of the lamps have been flashed and not flashed.

Figure 2:
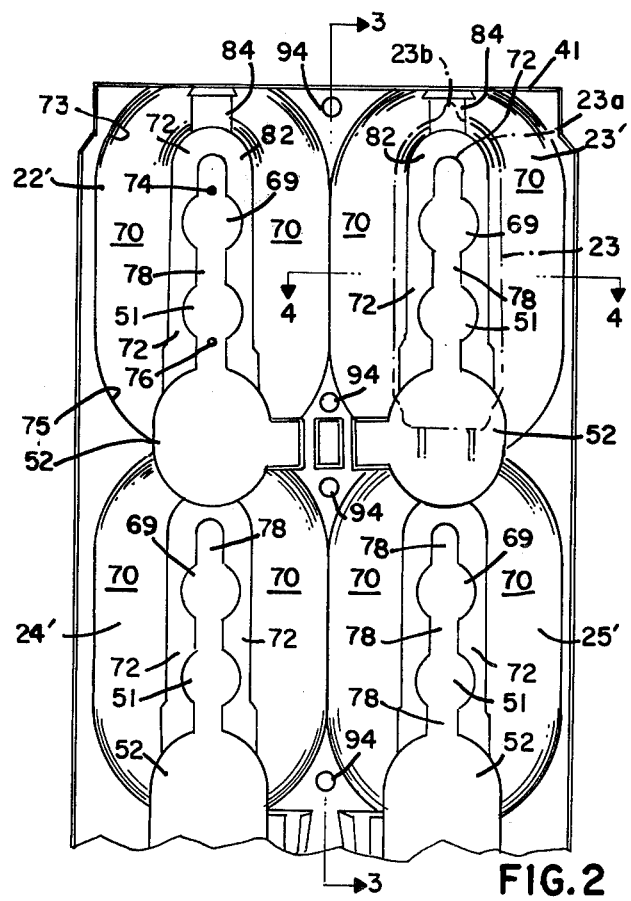
FIG. 2 is a front elevational view of the upper half of the reflector array employed in the unit of FIG. 1 with one of the lamps thereof shown in phantom, the lower half of the reflector array being symmetrical therewith; the view particularly illustrates structural features according to one embodiment of the invention.

Referring to FIG. 2, openings 51 are provided through the reflector unit 41 and the circuit board (not shown) to facilitate radiation from the flash lamps reaching the flash indicators. The rear housing member 37 is transparent (either of clear material or provided with window openings) to permit viewing of the indicia on the indicia sheet. The front housing member 36 is transparent at least in front of the lamps 22, etc., to permit light from the flashing lamps to emerge forwardly of the array and may be tinted to alter the color of the light from the flashlamps.

The height and width of the rectangular array are substantially greater than its thickness, and the height and width of the reflector member 41, insulating sheet, and circuit board 43 are substantially the same as the interior height and width of the housing member 36 to facilitate holding the parts in place.

The circuit board 43 has a printed circuit therein, such as described in the aforementioned U.S. Pat. Nos. 3,894,226 or 4,017,728, for causing sequential flashing of the lamps by firing voltage pulses applied to terminals on tabs 20 and 20'. The top and bottom halves of the printed circuitry preferably are reversed mirror images of each other. The lead-in wires of the lamps 22, etc., may be attached to the circuit board 43 in various ways such as by means of metal eyelets secured in respective lead-through holes in the circuit board. The lead-in wires pass through openings 52 in the reflector member 41 and through openings in the insulating sheet (not shown) and into or through respective pairs of eyelets crimped to hold the lead wires and make electrical contact thereto.

Areas 59 on the transparent front housing members 36 may be opaque or partly opaque, such as by making the surface roughened at these areas, to fully or partially conceal the lamp lead-in wires and/or the lower portions of the lamps, for improved appearance of the array.

As further described in U.S. Pat. Nos. 3,894,226 and 4,017,728, the circuitry on circuit board 43 includes radiation switches which are in contact with and bridge across circuit runs that are connected to them. The material for the radiation switches may be suitable material initially having an open circuit or high resistance, the resistance thereof becoming zero or of a low value when the material receives radiation in the form of heat and/or light from a respective adjacent lamp upon the lamp being flashed. For this purpose, each of the radiation switches is respectively positioned behind and near to a flashlamp 24, 25, 23. Windows in the form of transparent sections or openings 69 are provided in the reflectors in front of the switches to facilitate radiation transfer. A suitable material for the radiation switches is silver carbonate dispersed in a binder such as polyvinyl resin. Each of these radiation switches, upon receiving heat and/or light radiation from the adjacent lamp when it is flashed, changes from an open circuit or high resistance to a closed circuit or low resistance between its switch terminals on the circuit board.

As has been explained, the lower portion of the circuit board contains a substantially reverse mirror image of the circuit on the upper part of the circuit board. The circuit runs from the plugged-in terminals at the lower part of the circuit board and extends upwardly so as to activate the circuitry in the upper half of the circuit board. Similarly, when the unit is turned around and tab 20' is plugged into a socket, the circuit board terminals will be connected to and activate the lamps which then will be in the upper half of the circuit board, hence in the upper half of the flash unit. This accomplishes, as has been stated, the desirable characteristic whereby only the group of lamps relatively farthest away from the camera lens axis will be flashed, thereby reducing or eliminating the undesirable red-eye effect.

As described in the aforementioned flip-flash patents, the array functions as follows. Assuming that none of the four lamps in the upper half of the unit have been flashed, upon occurrence of a first firing pulse applied across the terminals of tab 20, this pulse will be directly applied to the lead-in wires of the first connected flashlamp 24, whereupon the lamp 24 flashes and becomes an open circuit between its lead-in wires. Heat and/or light radiation from the flashing first lamp 24 causes the adjacent first radiation switch to become a closed circuit (or a low value of resistance), thereby connecting the circuit board terminals electrically to a lead-in wires of the second lamp 25. By the time this occurs, the firing pulse has diminished to a value insufficient to cause the second lamp 25 to flash. When the next firing pulse occurs, it is applied to the lead-in wires of the second lamp 25 via the now closed first radiation switch whereupon the second lamp 25 flashes, thereby causing an adjacent second radiation switch to assume zero or low resistance, and the second lamp 25 now has an open circuit or high resistance between its lead-in wires. When the next firing pulse occurs, it is applied via now-closed second radiation switch to the third lamp 23, thereby firing the lamp which becomes an open circuit, and the radiation from it causes an adjacent third radiation switch to become essentially a closed circuit across its terminals. Thus, the next firing pulse will be applied via the now-closed third radiation switch to the lead-in wires of the fourth flashlamp 22, thereupon causing the lamp to flash. When the flash unit is turned around and the other connector tab 20' attached to the camera socket, the group of lamps that then become uppermost and relatively farthest away from the lens axis will be in the active circuit and will be flashed in the same manner as has been described. In a preferred embodiment, the lamps 22, etc., are high voltage types requiring about 2,000 volts, for example, at low current for flashing, and they are being fired by impacting or stressing a piezoelectric element in the camera.

In accordance with the present invention, a unique reflector-lamp module is provided whereby an oversized lamp is accommodated in the confines of this very compact packaging arrangement with little or no loss of light output. More specifically, the module configuration of the invention enables a very significant cost savings to be obtained by permitting the use of larger soft glass lamps in place of the previously employed hard glass flashlamps, while maintaining output and safety requirements. For example, a typical prior art flip flash unit employed comparatively expensive hard glass lamps having the following parameters: a tubular envelope of type 7073 glass having a wall thickness of about 32 mils; a diameter of about 0.285 inch for the finished coated lamp; a length of about 1 1/32 inches; an internal volume of 0.35 cc; an oxygen pressure of 950 cm. Hg (12.5 atmospheres); and a fill of 14 mgs. of shredded zirconium.

For comparison, the following are the parameters of a soft glass flashlamp accommodated by the reflector configuration according to one embodiment of the present invention; a tubular envelope of type 0010 or 0012 glass having a thickness of about 32 mils; a diameter of about 0.325 inch for the finished coated lamp (about 40 mils larger than the hard glass lamp); a length of about 1 1/32 inches; and an internal volume of about 0.5 cc (0.15 cc. larger). Due to the larger internal volume, the oxygen pressure is reduced to 675 cm. Hg. (8.8 atmospheres). The shredded zirconium fill is about 14 mgs. It is the nearly 30% reduction in oxygen pressure which makes it possible to use standard soft glasses, such as 0010 or 0012, which have a substantially lower material cost and are easier to fabricate into lamp envelopes.

Figure 3:
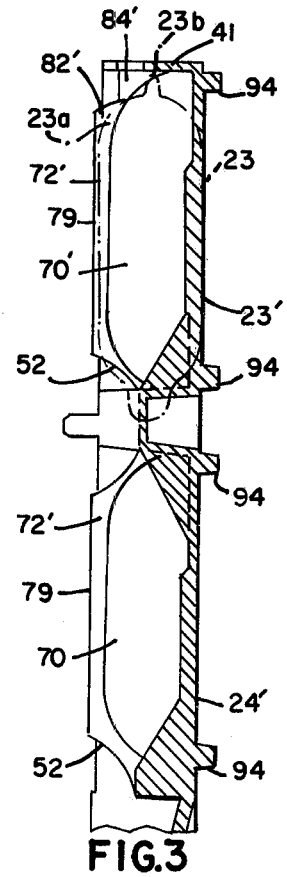
FIG. 3 is a cross-sectional view taken along line 3—3 of FIG. 2 with the location of the lamp within one of the reflectors denoted by dashed lines.
Figure 4:
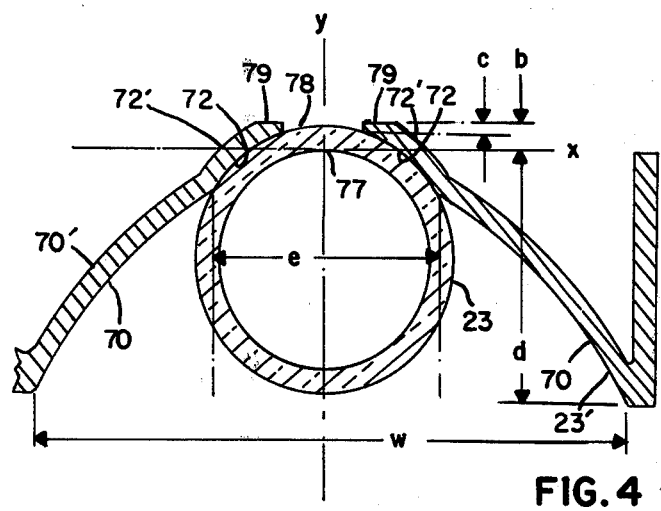
FIG. 4 is a cross-sectional view taken along line 4—4 of FIG. 2 with a lamp shown in place.

The reflector configuration which accommodates this substantially "fatter" lamp is illustrated in FIGS. 2-4. Each of the reflector cavities 22', 23' etc., is formed with a substantially parabolic reflecting surface 70 having a centrally disposed elongated cylindrical recess 72 extending substantially the entire height of the reflector cavity. In FIG. 3, the numerals 70' and 72' denote the convex back sides of the parabolic and cylindrical recess portions, respectively.

Referring to the reference numerals on reflector 22' of FIG. 2, in the preferred embodiment illustrated, surface 70 of the reflector curvature is formed at the upper end as a partial surface of revolution 73 revolved about point 74, and at the lower end, the curvature is formed as a partial surface of revolution 75 revolved about point 76. Between these upper and lower surfaces of revolution, surface 70 is completed by a vertically cylindrical parabolic central portion. A cross section of this parabolic central portion is shown in FIG. 4. Surface 70 is defined by a true parabola having the equation $x^2=4ay$, where a is the focal length and x and y are oriented as shown in FIG. 4, y lying on the optical axis and x passing through the vertex 77 of a projection of the parabola into space. The equation may also be expressed as $y=x^2/4a$. In a specific embodiment used with the specific lamp parameters described hereinbefore, width W of the reflector at the aperture plane is about 0.750 inch, and the focal length a is about 0.118 inch (for practical purposes the negative y coordinates of the parabolic curvature shown in FIG. 4 are given positive values). Using these values, the depth d of the parbolic curvature of the reflector, i.e. the distance from the vertex 77 to the aperture plane, may be determined by appropriate substitution in the above equation for a parabola. Therefore, curvature depth $$d = y = \frac{x^2}{4a} = \frac{(W/2)^2}{4a} = \frac{(0.75/2)^2}{4(0.118)} = 0.298 \text{ inch.}$$

To accommodate the lamp 23, which has a nominal diameter of 0.325 inch, the cylindrical recess 72 extends the back of the reflector beyond vertex 77. More specifically, as shown in FIG. 4, the recess 72 interrupts the parabolic surface 70 before the vertex is reached to provide a spacing e of 0.298 inch. In the preferred case of a molded reflector member 41, the average thickness of the reflector walls is about 0.025 inch.

At the back of the recess 72, and centrally located therein, is a longitudinally extending slot 78 which extends substantially the entire length of the recess and is open at the lower end toward opening 52. The slot 78 has an average width of about 0.094 inch but also includes the radiation-transmitting openings 51 and 69, which each have an enlarged circular shape of about 0.187 inch in diameter. The convex back side 72' of the recessed portion of the reflector is flattened along at least portions 79 thereof adjacent the periphery of the slot 78. As a result, the thickness of the recessed portion 72 of the reflector is tapered to be substantially thinner about at least portions of the periphery of slot 78. In the specific embodiment being described, the thinnest portion of the taper has a thickness c of about 0.007 inch. Hence, the thickness of the tapered portions of the reflector is reduced by a ratio of at least about 3.5 to 1. The dimension b between the vertex 77 and the flattened back 79 of the reflector is 0.032 inch. Hence, the total dimension from the aperture plane to the back surface 79 (d+b) is about 0.330 inch. Substracting c, the dimension to the tapered portion of recess 72 along the periphery of slot 78 is about 0.323 inch.

FIGS. 2-4 also illustrate the position of tubular flashlamp 23 (in phantom) as nested within the recessed portions 72 of reflector 23'. The enlarged lamp diameter (0.325 inch nominal) is compactly accommodated by the slotted and tapered recess, with the slot permitting the rear surface of the lamp to extend beyond the reflector surface 72, as best shown in FIG. 4. Further as illustrated with respect to the phantom image of lamp 23, each of the lamps has a constriction defining a shoulder 23a terminating in an exhaust tip 23b. In complement, thereto, each of the upper two reflector cavities, 22' and 23', further includes first and second "dimples" 82 and 84 formed therein at the top of the cylindrical recess 72. Actually, 82 may be a surface of revolution, and 84 may be a small cylindrical recess. The surface of these "dimples" on the back side of the reflector 23' in FIG. 3, are denoted by 82' and 84', respectively. As best shown in FIGS. 2 and 3, "dimple" 82 provides clearance for shoulder 23a of the lamp envelope, and "dimple" 84 accommodates the exhaust tip 23b.

In the case of the lower two reflector cavities 24' and 25', the opening 52 eliminates the need for a "dimple" 84 and eliminates the top portion of the "dimple" 82 surface area.

A first approach to the problem of accommodating the larger lamp was to cut a large central slot in the parabolic reflector having a width about the same as that of the present recess 72. This elimination of essentially all of the reflector surface immediately behind the lamp resulted in a 12% to 13% loss in light output. In an attempt to offset this loss, an aluminized planar sheet of plastic was placed behind the lamp and slotted reflector. The addition of this planar reflective element behind the lamp improved the efficiency of the lamp-reflector module by more than 5%, thus reducing the loss to about 7%. This surprisingly large gain in output and efficiency was quite surprising in that the lamp masks or covers the light reflected from the planar element. Yet more unexpected was the even greater gain in efficiency obtained by using the slotted cylindrical recess described above with respect to FIGS. 2-4, without the planar reflective element. Use of this reflector with the original small diameter hard glass lamp reduced the output loss to less than 2%. Employing a larger lamp in a given reflector was found to provide yet a further increase in efficiency. Hence, when the slotted recessed reflector was combined with the large soft glass lamp, not only was the necessarily large lamp size accommodated but essentially the entire output loss was recovered. In short, this unique combination enabled the use of a soft glass lamp in the same flash unit package size with little or no loss of light output. In the specific embodiment described, the lamp-to-reflector width ratio of the invention is about 0.435:1 as compared to the prior art system ratio of about 0.38:1.

A further advantage of this combination is that the larger lamp is located more accurately in the reflector slot and is in closer proximity to the heat sensitive switches on the circuit boards, thus providing improved switching operation.

Figure 5:
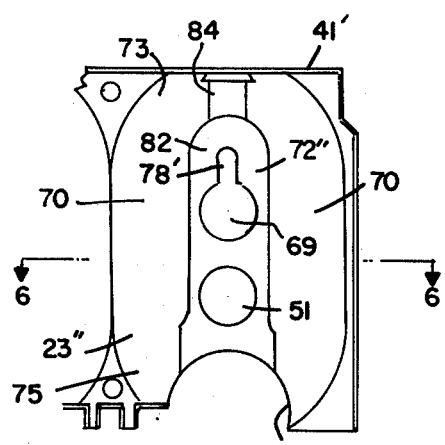
FIG. 5 is a front elevational view of a single reflector module of the array employed in the unit of FIG. 1 according to an alternative embodiment of the invention.
Figure 6:
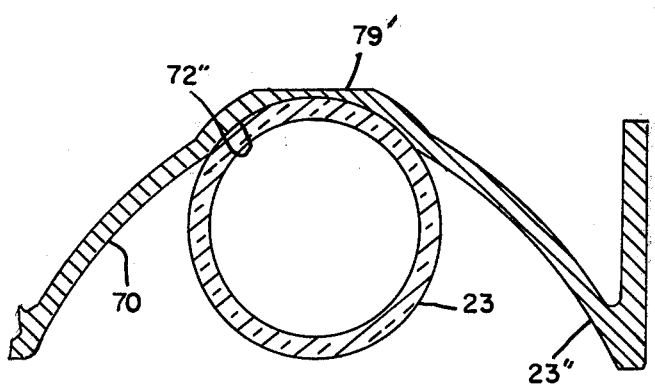
FIG. 6 is a cross-sectional view taken along line 6—6 of FIG. 5 with a lamp shown in place.

FIGS. 5 and 6 illustrate an alternative embodiment of the reflector according to the invention for increasing its structural rigidity. In this case reflector 23" of a modified reflector member 41' is shown having a slot 78' which is interrupted at one or more locations by a web of the molded plastic material continuing the cylindrical surface of the front side of the recessed portion 72" and the flattened surface 79' of the back side of the recessed portion. The slot 78' is not open at the lower end.

In the preferred embodiment, reflector member 41 is injection molded from a plastic material, such as polystyrene, and has an average wall thickness of about 25 mils; the front side is then aluminized to provide the reflecting surfaces. According to an alternative embodiment, the reflector member may be vacuum formed from a sheet of plastic material, such as cellulose propionate, having a maximum wall thickness of about 15 mils. In such case, the flattened back surface 79 and resulting taper about the slot or periphery may be dispensed with as the material at the rear of the recess becomes quite thin-walled as a result of the vacuum-forming process. The structural rigidity obtained by continuing the cylindrical recess to provide one or more webs of vacuum formed material across the slot of the back of the recess, in a similar manner to that shown in FIGS. 5 and 6, is particularly advantageous in this thin-walled vacuum-formed embodiment.

Hence, although the invention has been described with respect to specific embodiments, it will be appreciated that modifications and changes may be made by those skilled in the art without departing from the true spirit and scope of the invention.

What is claimed is:

1. A photoflash device comprising the combination of a reflector and a photoflash lamp wherein:

said photoflash lamp is a tubular lamp, said reflector has a substantially parabolic surface with a centrally disposed elongated cylindrical recess having a longitudinally extending slot centrally located therein, and said lamp is nested within said recessed portion of the reflector.

2. The device of claim 1 wherein the thickness of the recessed portion of said reflector is tapered to be substantially thinner about at least portions of the periphery of said slot, said lamp being nested adjacent the recessed and tapered portion of said reflector.

3. The device of claim 2 wherein said reflector comprises a molded material, and the convex cylindrical shape of the back side of the recessed portion of said reflector is flattened along at least portions thereof adjacent the periphery of said slot, said flattened portions providing said tapered portions.

4. The device of claim 3 wherein the thickness of the tapered portions of said reflector is reduced by a ratio of at least about 3.5 to 1.

5. The device of claim 4 wherein said slot extends substantially the entire length of said recess and is open at one end.

6. The device of claim 5 wherein said slot includes at least one enlarged circular opening.

7. The device of claim 4 wherein said slot is interrupted at one or more locations by a web of said molded material continuing the cylindrical surface of the front side of said recessed portion and the flattened surface of the back side of said recessed portion, thereby increasing the structural rigidity of said reflector.

8. The device of claim 1 wherein the parabolic portion of said reflector terminates at its upper and lower ends in surfaces which are at least partially surfaces of revolution.

9. The device of claim 8 wherein said reflector also has a vertically cylindrical parabolic central portion.

10. The device of claim 1 wherein said reflector comprises a vacuum-formed material having a maximum wall thickness of about 15 mils.

11. The device of claim 10 wherein said slot is interrupted at one or more locations by a web of said vacuum-formed material continuing the cylindrical recess to thereby increase the structural rigidity of said reflector.

12. The device of claim 10 wherein said slot extends substantially the entire length of said recess and is open at one end.

13. The device of claim 12 wherein said slot includes at least one enlarged circular opening.

* * * * *